No. 727,575. Patented May 12, 1903.

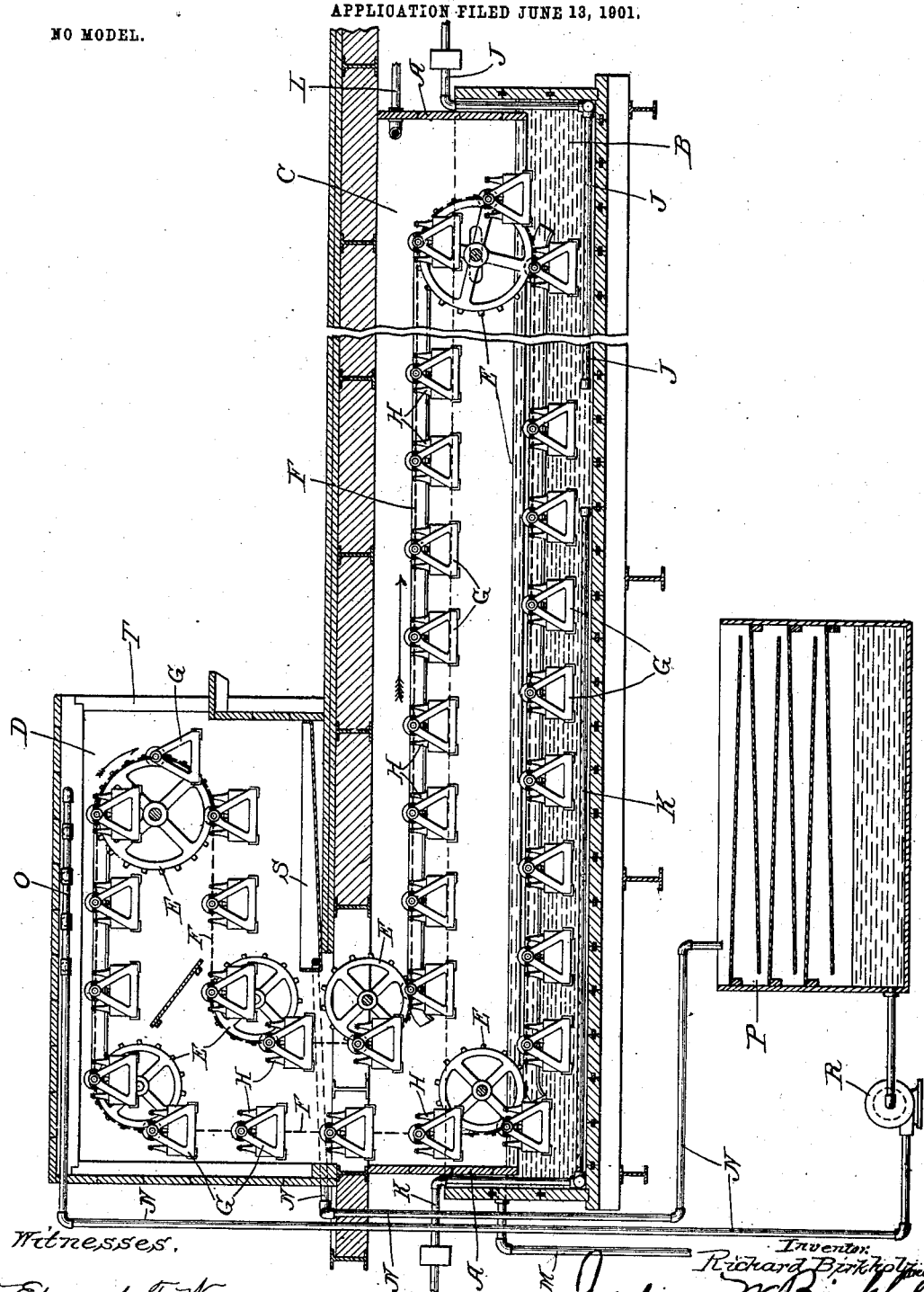

UNITED STATES PATENT OFFICE.

JULIUS W. BIRKHOLZ, OF MILWAUKEE, WISCONSIN, ADMINISTRATOR OF RICHARD BIRKHOLZ, DECEASED, ASSIGNOR TO THE LINK BELT MACHINERY COMPANY, OF CHICAGO, ILLINOIS, A CORPORATION OF ILLINOIS.

PROCESS OF TREATING BOTTLED GOODS.

SPECIFICATION forming part of Letters Patent No. 727,575, dated May 12, 1903.

Application filed June 13, 1901. Serial No. 64,347. (No specimens.)

*To all whom it may concern:*

Be it known that RICHARD BIRKHOLZ, deceased, late a citizen of the United States, residing at Milwaukee, in the county of Milwaukee and State of Wisconsin, did invent a certain new and useful Improvement in Processes of Treating Bottled Goods, of which the the following is a specification.

Said invention relates to a process for treating by variations in temperature bottled goods, and has particular reference to a succession of steps in a process whereby the bottles are safely raised from a relatively low temperature to a relatively high temperature and the temperature is then reduced, by means in which the heat extracted from the bottles in cooling them is preferably conserved for the purpose of assisting in raising the temperature of the incoming cool bottles.

There are various steps, as above suggested and hereinafter to be more fully explained, which may be variously combined and some of them omitted to carry out the invention.

The drawing illustrates a longitudinal section through an apparatus adapted to carry out the process.

Like parts are indicated by the same letter in the drawing.

A is a closed tank having the body of still water B in the bottom thereof and the hot-vapor chamber C at the top.

D is an upper chamber; E E, a series of pulleys or sprocket-wheels over which runs the belt F, provided with the carriers G G, in which the receptacles or bottles H H are contained.

J is a pipe entering the tank at one end and discharging steam or hot water into one end of the tank, and K is a similar pipe at the other end of the tank.

L is a pipe through which steam or hot water can be introduced into the vapor-chamber, and M a pipe through which the overflow in the tank A can be drawn off.

N N are a series of pipes connected at one end with the spray-pipe O, provided with discharge-apertures in the upper part of the vapor-chamber D, above the line of travel of the bottles, and connected at the other end with the cooling-tank P and the device R for keeping up the circulation of the water.

S is a pan which receives the water discharged from the apertures in the pipe O, and thus a circulation is maintained from the pan S through the pipes N to the cooling-chamber P, thence by pipe N through the circulation device or pump R, thence through the pipes N to the discharge-apertures in the pipe O, thence down across the two lines of travel of the bottles to the pan.

T is the opening into the chamber D, whereby the bottles are removed from and placed in the carriers.

The operation of the several devices is as follows: The bottles at some point along the line of travel are put into the receptacle. As they pass along they are first subjected to a spray of water which is hotter than the bottles, and which therefore heats the bottles somewhat and is itself relatively cooled and then falls into the tank or pan below. The bottles pass on and are then subjected to the action of the vapor-chamber and then to the still water in the tank. This tank-water is preferably of varying temperature along the line of travel of the bottles and the bottles are very considerably heated. They then emerge from this tank and continue their journey until they reach the point where they are again subjected to the action of the circulating water, preferably the same as the water to which they were previously subjected, and which therefore is at this point cooler than the bottles, for the bottles have now become highly heated and the water has become cooled by its exposure to the cool bottles and perhaps, also, by the action of the cooling-coil or the cooling-chamber, if either or both of these devices should be employed. The water is now heated by the hot bottles and returned by the pipes to the point where it is discharged upon the incoming bottles, while the bottles which have just passed through the tank are removed.

It will be evident that the arrangement of parts can be very greatly varied without departing from the spirit of the invention and that some steps in the process may be omitted without affecting the action of the other or remaining steps.

What is claimed is—

1. The process of treating bottled goods, which consists in subjecting the filled bottles in their relatively cool condition, to the action of relatively hot circulating water, then passing them through a heating medium and simultaneously exposing their thickened portions to a heat greater than that to which the rest of the bottles are exposed.

2. The process of treating bottled goods, which consists in subjecting the filled bottles in their relatively cool condition, to the action of relatively hot circulating water, then passing them through a heating medium and simultaneously exposing their thickened portions to a heat greater than that to which the rest of the bottles are exposed, then passing them through a body of heating-water.

3. The process of treating bottled goods, which consists in subjecting the filled bottles in their relatively cool condition, to the action of relatively hot circulating water, then passing them through a heating medium and simultaneously exposing their thickened portions to a heat greater than that to which the rest of the bottles are exposed, then passing them through a body of heating-water, then exposing them to the action of the said circulating water in its relatively cool condition.

4. The process of treating bottled goods, which consists in subjecting the filled bottles in their relatively cool condition, to the action of relatively hot circulating water, then causing them to travel through a hot vapor, simultaneously exposing their thickened portions to a heat greater than that to which the rest of the bottles are exposed, then passing them through a body of water, which varies in temperature along the line of their travel.

JULIUS W. BIRKHOLZ,
*Administrator of the estate of Richard Birkholz, deceased.*

Witnesses:
  FRED A. FOSTER,
  CHAS. E. WILD.